United States Patent Office 3,174,825
Patented Mar. 23, 1965

3,174,825
SODIUM CHLORIDE PRODUCT HAVING A REDUCED CAKING TENDENCY AND PROCESS FOR PRODUCING SAME
James Derek Birchall, Winsford, England, assignor to Imperial Chemical Industries Limited, London, England, a corporation of Great Britain
No Drawing. Filed July 29, 1963, Ser. No. 298,408
Claims priority, application Great Britain, Aug. 13, 1962, 30,989/62
7 Claims. (Cl. 23—89)

This invention relates to an improved process for treating common salt (sodium chloride) in order to reduce its tendency to cake on storage particularly when exposed to the weather out of doors.

Common salt is well known to cake on storage in contact with the atmosphere owing, it is considered, to the effect of repeated cycles in which the salt absorbs atmospheric moisture when the relative humidity is above about 70% and gives it up whenever it falls below this value. The absorption of moisture results in the faces of the salt crystals becoming covered with a saturated solution of sodium chloride, and when the relative humidity next falls evaporation of saturated solution takes place, crystal growths form on and between the faces and bind one crystal to another to give the effect of caking. Other factors such as temperature, packing pressure, length of time in storage and crystal shape also influence the degree of caking, but the major cause is the alternate adsorption and evaporation of water.

It is known that the addition of certain compounds, particularly soluble ferrocyanides, ferricyanides, nitroprussides and carbonyl ferrocyanides, and nitrilotriacetamide, to common salt in small amounts, generally about 5 to 10 parts per million by weight, can in favourable circumstances much reduce the degree of caking. It is considered that these compounds modify the crystal habit of sodium chloride in such a way that the new crystals formed by evaporation of saturated solution on the faces of the existing crystals are mechanically weak, easily broken and consequently are unable to form firm bonds between existing crystals.

It is also known that at higher concentrations soluble ferrocyanides can not only inhibit caking but also prevent the "freezing" of salt caused by the formation at temperatures below 0.15° C. of the dihydrate NaCl.2H₂O which bonds adjacent crystals. It is thus common to treat salt stored outside for winter use with 200 to 500 parts per million by weight of for example sodium ferrocyanide.

When salt after treatment with a soluble ferrocyanide, for example sodium ferrocyanide, or with another of the soluble compounds that have the effect of reducing the tendency to cake, is stored out of doors it is found that the ferrocyanide or other soluble compound is often leached out by rain. To illustrate this effect of rain, a heap of ten tons of crushed rock salt was treated with sufficient sodium ferrocyanide to give an average concentration throughout of about 220 parts per million parts of salt by weight. The heap was 56 inches high and was exposed to the weather for three weeks during which 2.3 inches of rain fell on it. Samples taken thereafter at different heights from the top of the heap were found to have sodium ferrocyanide contents as shown in Table I.

Table I

| Vertical distance from top of heap | Sodium ferrocyanide content, parts per million by weight |
|---|---|
| 2 inches | 16 |
| 6 inches | 31 |
| 12 inches | 37 |
| 24 inches | 97 |
| 36 inches | 568 |
| 48 inches | 288 |
| 56 inches (bottom) | 213 |

The results show that the surface layers are quickly depleted, and under freezing conditions a hard crust would form on such a pile. Relatively insoluble ferrocyanides such as those of zinc and aluminium are ineffective in preventing the freezing hereinbefore referred to, because they yield insufficient ferrocyanide ions in solution.

Thus if one is to take advantage of the known valuable effects of the soluble ferrocyanides and other compounds hereinbefore mentioned in preventing caking and freezing it is necessary in some way to reduce their solubility in water. It has been proposed to coat ferrocyanides with paraffin wax, and whilst this is effective in some degree it is not easy to apply wax uniformly to crystals.

I have now found that by treating a soluble anticaking agent such as a ferrocyanide with certain liquid organosilicon compounds the agent acquires a much increased resistance to dissolution by water and thus to being leached out of salt in which it has been incorporated.

According to my invention a process for reducing the tendency of sodium chloride to cake comprising adding to solid sodium chloride a minor proportion of a water-soluble substance chosen from the group consisting of soluble ferrocyanides, ferricyanides, nitroprussides and carbonyl ferrocyanides, and nitrilotriacetamide is characterised in that said water-soluble substance is treated with at least one liquid organic siloxane.

Liquid organic siloxanes are defined for purposes of the invention as compounds that are liquid and non-waxy under ambient atmospheric conditions and contain the repeating groups

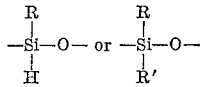

where R, R' represent alkyl or aryl radicals. Their molecular structure may be linear or cyclic; if linear the chains may be terminated with hydroxyl groups or with trialkylsilyl groups for example $(CH_3)_3Si—$. Examples of these cyclic siloxanes are tetramethyl cyclotetrasiloxane $(CH_3HSiO)_4$ and the related pentamethyl and hexamethyl compounds $(CH_3HSiO)_5$ and $(CH_3HSiO)_6$. Examples of linear siloxanes are methyl hydrogen polysiloxanes chain-terminated with trimethyl silyl groups $CH_3SiO(CH_3HSiO)_nSi(CH_3)_3$, particularly those having molecular weights of about 6000, and dimethyl siloxane/methyl hydrogen siloxane copolymers chain-terminated with trimethyl silyl groups, for example

The amount of siloxane necessary to give sufficient protection is from about 0.10 to 5.0%, usually 0.50 to 2.0% by weight.

Compared with the procedure required for successfully coating soluble anticaking agents with normally waxy materials it is relatively simple and easy to treat the agents with these liquid organic siloxanes by an ordinary mixing process since they are non-sticky, mobile liquids that readily wet the crystals of the agents without causing them to coalesce. The water-repelling effect develops when the siloxane comes into contact with moisture and reacts therewith to give a water-resistant polymeric film over the crystals. Thus when the siloxane-coated anticaking agent is distributed throughout the sodium chloride any moisture adhering to the crystals of the latter or falling as rain brings about the desired effect. Complete water-resistance is not achieved, and of course would be undesirable since no anticaking agent would then be able to be present in the saturated solution of sodium chloride surrounding the NaCl crystals and to exert its effect on crystal-habit. The very slow rate of dissolving of the siloxane-treated anticaking agent provides a continuing supply of agent in contact with sodium chloride crystals over long periods.

To illustrate the effect of the siloxane, potassium ferrocyanide of approximately 1.0 mm. particle size was treated with 2% by weight of tetramethyl cyclotetrasiloxane $(CH_3HSiO)_4$ by wetting and tumbling in a closed cylinder for 12 hours. 250 parts per million by weight of the treated ferrocyanide was then mixed with rock salt and the treated rock salt packed into a tube 4 inches in diameter and 48 inches high. The salt was sprayed with water at a rate corresponding to a rainfall of one inch per day. After the equivalent of 9 inches of rain the salt remaining was removed and analysed and found to contain about 150 parts per million by weight of potassium ferrocyanide. A similar experiment in which the salt was treated with potassium ferrocyanide alone, by spraying it with an aqueous solution of the latter, showed the salt to contain only 40–50 parts per million by weight after the equivalent of 9 inches of rain.

In more detailed experiments 1 kilogramme of rock salt treated in various ways was placed in a 2-inch diameter tube and leached with 250 ml. water added dropwise over 24 hours equivalent to 5 inches of rainfall. The effluent was analysed and the salt remaining in the tube removed and analysed. The results are shown in Table II.

Table II

| Salt treatment | Potassium ferrocyanide | | |
|---|---|---|---|
| | Weight originally in tube, g. | Weight after leaching, g. | Percent remaining |
| Sprayed with aqueous solution of potassium ferrocyanide | 0.302 | 0.0298 | 10 |
| Mixed with potassium ferrocyanide crystals, ca. 1.0 mm | 0.300 | 0.090 | 30 |
| Mixed with potassium ferrocyanide crystals ca. 1.0 mm, coated with 5% by weight of paraffin wax | 0.332 | 0.154 | 46 |
| Mixed with potassium ferrocyanide crystals ca. 1.0 mm, treated with 1% by weight tetramethyl cyclotetrasiloxane | 0.406 | 0.195 | 48 |

Whilst soluble ferrocyanides treated with siloxanes dissolve slowly in water, sufficient dissolves to prevent newly wetted rock salt freezing. For example, rock salt containing 200 parts per million by weight of sodium ferrocyanide treated with 1% by weight of tetramethyl cyclotetrasiloxane was moistened with 5% by weight of water and then exposed to a temperature of −10° C. within ten minutes and kept at this temperature. After 4 days freezing had still not occurred.

Wherever the expression sodium chloride appears in this specification and its claims it is to be understood to include rock salt, and salt made from brines by known evaporative processes including the solar evaporation of seawater, as well as the pure substance NaCl.

What I claim is:

1. A process for reducing the tendency of sodium chloride crystals to cake comprising providing a small quantity of crystals of a water-soluble compound selected from the group consisting of water-soluble ferrocyanides, ferricyanides, nitroprussides and carbonyl ferrocyanides and nitrilotriacetamide, coating said crystals of said water-soluble compound with about 0.1 to 5.0% by weight of at least one liquid organic siloxane that is capable of reacting with water to yield a water-resistant polymeric film, and adding said siloxane-coated crystals of said water-soluble compound to sodium chloride as an anti-caking agent.

2. A process as claimed in claim 1 wherein said water-soluble compound is alkali metal ferrocyanide.

3. A process as claimed in claim 1 wherein the siloxane is selected from the group consisting of tetramethyl cyclotetrasiloxane, pentamethyl cyclopentasiloxane and hexamethyl cyclohexasiloxane which have respectively the formulae $(CH_3HSiO)_4$, $(CH_3HSiO)_5$ and $(CH_3HSiO)_6$.

4. A process as claimed in claim 3 in which the siloxane is tetramethyl cyclotetrasiloxane, $(CH_3HSiO)_4$.

5. A process as claimed in claim 1 wherein said water-soluble compound is in an amount of from 5 to 500 parts per million by weight of sodium chloride.

6. A composition of matter comprising sodium chloride and, as an anti-caking agent therefor, from 5 to 500 parts per million by weight of a water-soluble anti-caking compound selected from the group consisting of water-soluble ferrocyanides, ferricyanides, nitroprussides and carbonyl ferrocyanides and nitrilotriacetamide, said water-soluble compound being coated with from 0.10 to 5.0% by weight of at least one liquid organic siloxane that is capable of reacting with water to yield a water-resistant polymeric film, so that said water-soluble anti-caking compound is water resistant.

7. A composition of matter comprising sodium chloride and, as an anti-caking agent therefor, from 5 to 500 parts per million by weight of sodium ferrocyanide coated with from 0.10 to 5.0% by weight of tetramethyl cyclotetrasiloxane $(CH_3HSiO)_4$ so that said ferrocyanide is water resistant.

References Cited by the Examiner

UNITED STATES PATENTS

| | | | |
|---|---|---|---|
| 2,500,770 | 3/50 | Pierce | 23—89 X |
| 2,866,760 | 12/58 | Haessler et al. | 23—89 X |
| 2,990,246 | 6/61 | Scott et al. | 23—89 |
| 3,036,884 | 5/62 | Kaufmann | 23—89 |

MAURICE A. BRINDISI, *Primary Examiner.*